United States Patent
Sugimoto

(10) Patent No.: US 9,951,710 B2
(45) Date of Patent: Apr. 24, 2018

(54) VEHICLE AND CONTROL METHOD FOR VEHICLE

(71) Applicant: Toyota Jidosha Kabushiki Kaisha, Toyota-shi, Aichi-ken (JP)

(72) Inventor: Hitoki Sugimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/458,350

(22) Filed: Mar. 14, 2017

(65) Prior Publication Data

US 2017/0268453 A1    Sep. 21, 2017

(30) Foreign Application Priority Data

Mar. 18, 2016 (JP) .................................. 2016-055063

(51) Int. Cl.
*F02D 41/30* (2006.01)
*F02D 41/26* (2006.01)
*F02D 41/22* (2006.01)
*B60B 35/12* (2006.01)

(52) U.S. Cl.
CPC .......... *F02D 41/3094* (2013.01); *B60B 35/12* (2013.01); *F02D 41/22* (2013.01); *F02D 41/26* (2013.01); *F02D 2200/101* (2013.01); *F02D 2200/1015* (2013.01)

(58) Field of Classification Search
CPC ...... F02D 41/30; F02D 41/3094; F02D 41/22; F02D 41/26; F02D 2200/101; F02D 2200/1015; B60B 35/12
See application file for complete search history.

(56) References Cited

U.S. PATENT DOCUMENTS 6,973,910 B2 * 12/2005 Ohtani ................ F02D 41/1498
                                                            123/295
9,273,592 B2 *  3/2016 Nagakura ............. F02B 17/005
2013/0174806 A1  7/2013 Nagakura

FOREIGN PATENT DOCUMENTS

JP      2013-108485 A    6/2013
JP      2013-141910 A    7/2013

* cited by examiner

*Primary Examiner* — Hieu T Vo
(74) *Attorney, Agent, or Firm* — Dinsmore & Shohl LLP

(57) ABSTRACT

An electronic control unit sets a misfire determination threshold to a first value in the cylinder injection mode, and sets the misfire determination threshold to a second value smaller than the first value in the port injection mode, and determines that a misfire occurs in the engine when a rotation fluctuation of the engine is larger than the misfire determination threshold. In a case where the cylinder injection mode is changed to the port injection mode, when a predetermined period has elapsed from the change, the electronic control unit changes the misfire determination threshold from the first value to the second value.

6 Claims, 5 Drawing Sheets

VEHICLE AND CONTROL METHOD FOR VEHICLE

CROSS-REFERENCE TO RELATED APPLICATIONS

This application claims priority to Japanese Patent Application No. 2016-055063 filed on Mar. 18, 2016 and incorporated herein by reference in its entirety.

BACKGROUND

1. Technical Field

The present disclosure relates to a vehicle and a control method for a vehicle, and more particularly, to a vehicle provided with an engine including a cylinder injection valve and a port injection valve.

2. Description of Related Art

Conventionally, as a vehicle of this type, such a vehicle has been proposed that, in a configuration provided with an engine including a cylinder injection valve and a port injection valve, an operating state and an injection state of the engine at the time when a misfire has occurred are stored so as to find an abnormal-time operating state for each injection state, an abnormal-time injection state is determined based on the number of misfires for each injection state in which a misfire has occurred during a detection period of a misfire abnormality, and an abnormal-time operating state in the abnormal-time injection state thus determined is stored (see, for example, Japanese Patent Application Publication No. 2013-108485 (JP 2013-108485 A)). Here, the operating state includes a rotation speed, a load factor, and a warming-up state (whether or not a water temperature is a warming-up temperature or more). The injection state includes a cylinder injection state where fuel is injected only from a cylinder injection valve, a port injection state where the fuel is injected only from a port injection valve, and a joint injection state where the fuel is injected from the cylinder injection valve and the port injection valve. In this vehicle, the abnormal-time operating state can be stored in association with an injection state at the time when a misfire has occurred according to the above process. Accordingly, in a case where a normal return determination is performed after a misfire abnormality detection, the determination can be performed appropriately.

SUMMARY

In such a vehicle, a rotation fluctuation of the engine easily increases in the cylinder injection state in comparison with the port injection state. On this account, in a case where it is determined that a misfire occurs in the engine at the time when the rotation fluctuation of the engine exceeds a misfire determination threshold, in order to improve determination accuracy, a misfire determination threshold in the cylinder injection state is made larger than a misfire determination threshold in the port injection state. In this case, in a case where the misfire determination thresholds are changed immediately from one to another at the time when the cylinder injection state is changed to the port injection state, when a state where the rotation fluctuation of the engine is large to some extent continues, it might be mistakenly determined that the engine has a misfire.

A vehicle of the present disclosure restrains a false determination of a misfire of an engine.

A vehicle according to as aspect of the present disclosure includes an engine including a cylinder injection valve configured to inject fuel into a cylinder, and a port injection valve configured to inject the fuel into an intake port and an electronic control unit configured to i) control the engine by changing between a cylinder injection mode and a port injection mode, the cylinder injection mode being a mode in which the fuel is injected into the cylinder only from the cylinder injection valve, the port injection mode being a mode in which the fuel is injected into the intake port only from the port injection valve, ii) set a misfire determination threshold to a first value in the cylinder injection mode, iii) set the misfire determination threshold to a second value smaller than the first value in the port injection mode, iv) determine that a misfire occurs in the engine when a rotation fluctuation of the engine is larger than the misfire determination threshold, and v) change the misfire determination threshold from the first value to the second value when a predetermined period has elapsed after the cylinder injection mode is changed to the port injection mode. An example aspect of the present disclosure provides a control method for a vehicle. The vehicle includes an engine including a cylinder injection valve configured to inject fuel into a cylinder, and a port injection valve configured to inject the fuel into an intake port, and an electronic control unit. The control method includes i) controlling, by the electronic control unit, the engine by changing between a cylinder injection mode and a port injection mode, the cylinder injection mode being a mode in which the fuel is injected into the cylinder only from the cylinder injection valve, the port injection mode being a mode in which the fuel is injected into the intake port only from the port injection valve, ii) setting, by the electronic control unit, a misfire determination threshold to a first value in the cylinder injection mode iii) setting, by the electronic control unit, the misfire determination threshold to a second value smaller than the first value in the port injection mode iv) determining, by the electronic control unit, that a misfire occurs in the engine when a rotation fluctuation of the engine is larger than the misfire determination threshold and v) changing, by the electronic control unit, the misfire determination threshold from the first value to the second value when a predetermined period has elapsed after the cylinder injection mode is changed to the port injection mode.

In the vehicle of the present disclosure, basically, in the cylinder injection mode, the misfire determination threshold is set to the first value, and in the port injection mode, the misfire determination threshold is set to the second value smaller than the first value, and when the rotation fluctuation of the engine is larger than the misfire determination threshold, it is determined that a misfire occurs in the engine. At this time, in a case where the cylinder injection mode is changed to the port injection mode, when a predetermined period has elapsed from the change, the misfire determination threshold is changed from the first value to the second value. It takes some time for the rotation fluctuation of the engine to decrease due to the change of the injection mode. Accordingly, by setting (changing) the misfire determination threshold as such, it is possible to restrain such a situation that the rotation fluctuation of the engine becomes larger than the misfire determination threshold even though a misfire does not occur in the engine, thereby making it possible to restrain a false determination of the misfire in the engine.

In the vehicle, the electronic control unit may be configured to change the misfire determination threshold from the second value to the first value immediately after the port injection mode is changed to the cylinder injection mode. An increase of the rotation fluctuation of the engine due to the change of the injection mode appears in a relatively short time. Accordingly, by setting (changing) the misfire determination threshold as such, it is possible to restrain such a situation that the rotation fluctuation of the engine becomes larger than the misfire determination threshold even though a misfire does not occur in the engine, thereby making it possible to restrain a false determination of the misfire in the engine.

In the vehicle, the electronic control unit may be configured to vi) calculate, as the rotation fluctuation, a change amount of a time required for an output shaft of the engine to rotate only by a predetermined rotation angle, and vii) determine the first value such that the first value when a rotation speed of the engine is large is smaller than the first value when the rotation speed of the engine is small, and viii) determine the second value such that the second value when the rotation speed of the engine is large is smaller than the second value when the rotation speed of the engine is small. With such a configuration, it is possible to more appropriately determine whether or not a misfire occurs in the engine, according to the rotation speed of the engine.

In the vehicle, the electronic control unit may be configured to change the misfire determination threshold from the first value to the second value when a predetermined period has elapsed after the cylinder injection mode is changed to the port injection mode while the engine performs an autonomous operation. In a case where the engine performs the autonomous operation (no-load operation), a misfire easily occurs in the engine as compared with a case where the engine performs a load operation. In view of this, in a case where the cylinder injection mode is changed to the port injection mode, when the predetermined period has elapsed from the change, the misfire determination threshold is changed from the first value to the second value, which has a larger significance in terms of restraining of a false determination of the misfire in the engine.

In addition, in the vehicle, an output shaft of the engine may be connected to an axle connected to driving wheels via a flywheel damper. In a case of the above configuration, after the cylinder injection mode is changed to the port injection mode, a state where the rotation fluctuation of the engine is large easily continues due to inertia of the flywheel damper. Accordingly, in a case where the cylinder injection mode is changed to the port injection mode, a significance of changing the misfire determination threshold from the first value to the second value when a predetermined period has elapsed from the change is larger.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A configuration to perform the present disclosure will be described below with reference to embodiments.

Figure 1:
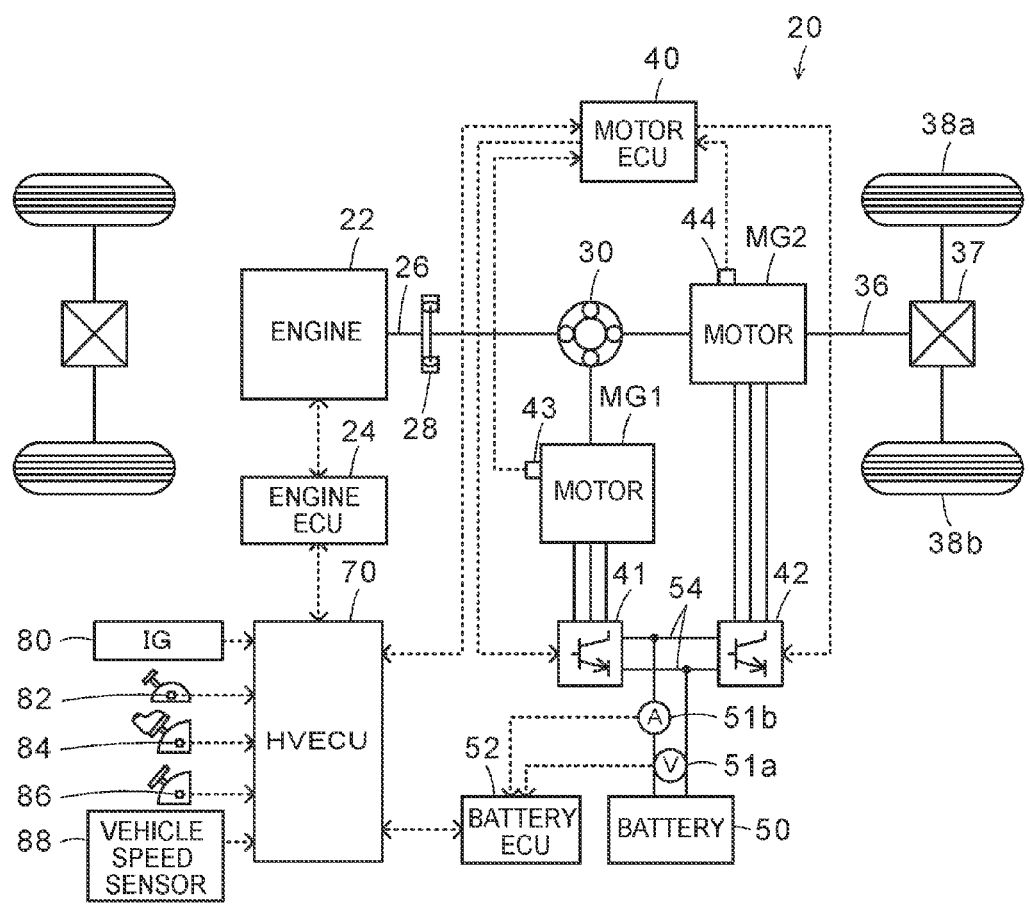
FIG. 1 is a configuration diagram illustrating an outline of a configuration of a hybrid vehicle 20 as one embodiment of the present disclosure.
Figure 2:
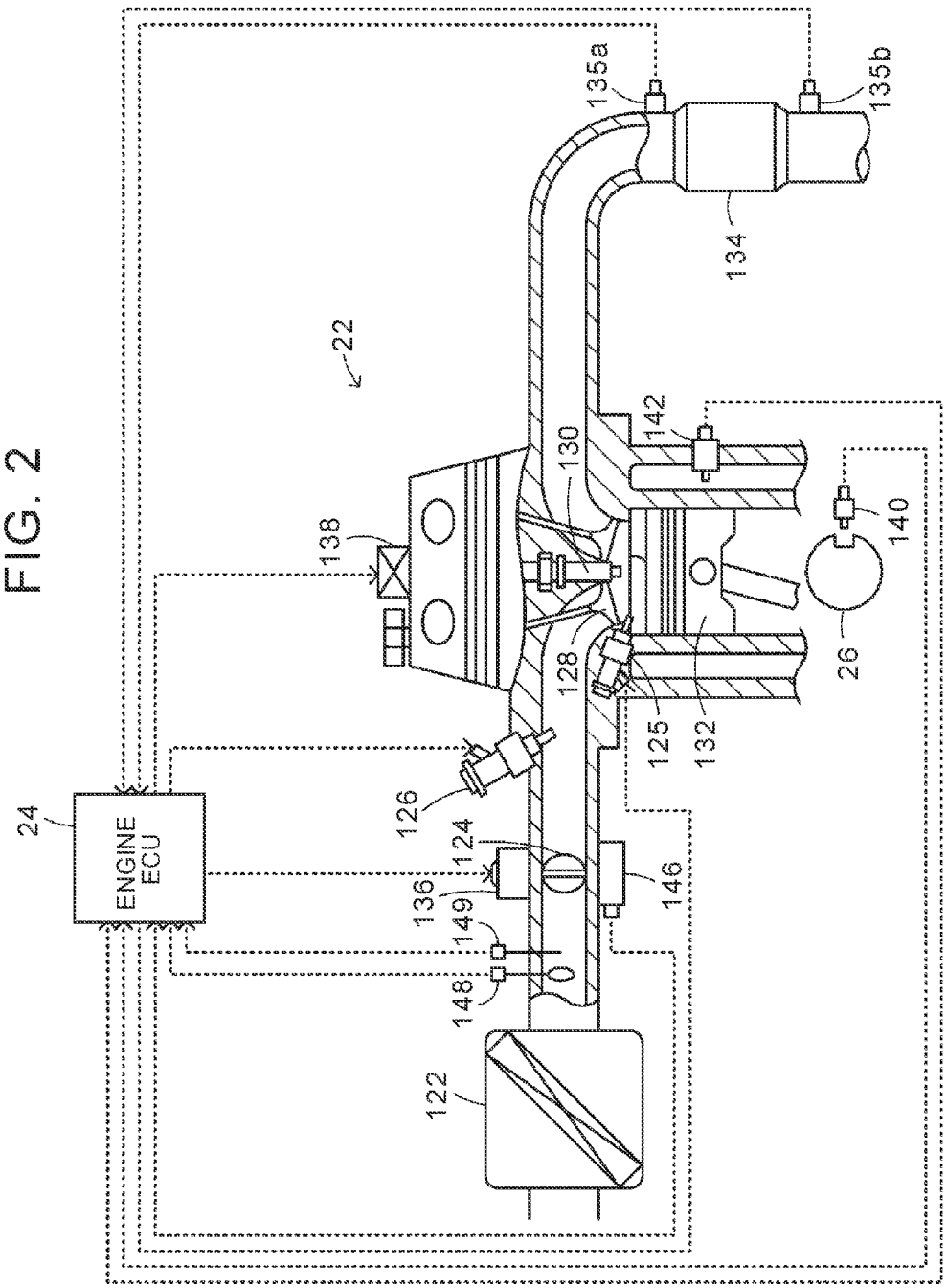
FIG. 2 is a configuration diagram illustrating an outline of a configuration of an engine.

FIG. 1 is a configuration diagram illustrating an outline of a configuration of a hybrid vehicle 20 as one embodiment of the present disclosure, and FIG. 2 is a configuration diagram illustrating an outline of a configuration of the engine 22. As illustrated in FIG. 1, the hybrid vehicle 20 of the embodiment includes an engine 22, a planetary gear 30, motors MG1, MG2, inverters 41, 42, a battery 50, and a hybrid electronic control unit (hereinafter referred to as the "HVECU") 70.

The engine 22 includes a plurality of cylinders (e.g., four cylinders, six cylinders, eight cylinders, and the like), and is configured as an internal combustion engine that outputs power by four strokes of intake, compression, expansion, and exhaust by use of fuel such as gasoline or light oil. As illustrated in FIG. 2, the engine 22 includes a cylinder injection valve 125 configured to inject the fuel into a cylinder, and a port injection valve 126 configured to inject the fuel into an intake port. Since the engine 22 includes the cylinder injection valve 125 and the port injection valve 126, the engine 22 can be operated in any of the following modes: a port injection mode, a cylinder injection mode, and a joint injection mode. In the port injection mode, air purified by an air cleaner 122 is taken via a throttle valve 124 and the fuel is injected from the port injection valve 126, so that the air is mixed with the fuel. A fuel/air mixture obtained herein is taken into a combustion chamber via an intake valve 128 and is exploded to burn by an electric spark by an ignition plug 130, so that a reciprocating motion of a piston 132 pushed down by energy of the explosion is converted into a rotational motion of a crankshaft 26. In the cylinder injection mode, the air is taken into the combustion chamber similarly to the port injection mode, and in the middle of the intake stroke or after reaching the compression stroke, the fuel is injected from the cylinder injection valve 125 and is exploded to burn by the electric spark by the ignition plug 130, so as to obtain a rotational motion of the crankshaft 26. In the joint injection mode, the fuel is injected from the port injection valve 126 at the time when the air is taken into the combustion chamber, and in the middle of the intake stroke or after reaching the compression stroke, the fuel is injected from the cylinder injection valve 125 and is exploded to burn by the electric spark by the ignition plug 130, so as to obtain a rotational motion of the crankshaft 26. These injection modes are changed based on an operating state of the engine 22. An exhaust gas from the combustion chamber is discharged to external air via a clarifier 134 having a cleaning catalyst (a three-way catalyst) that purifies harmful components such as carbon monoxide (CO), hydrocarbon (HC), and nitrogen oxide (NOx).

An operation of the engine 22 is controlled by an engine electronic control unit (hereinafter referred to as the engine ECU) 24. Although not illustrated herein, the engine ECU 24 is configured as a microprocessor mainly constituted by a Central Processing Unit (CPU), and includes a Read Only Memory (ROM) for storing a processing program, a Random Access Memory (RAM) for temporarily storing data, input/output ports, and a communication port, in addition to the CPU.

Signals from various sensors necessary to control the operation of the engine 22 are input into the engine ECU 24 via the input port. The signals input into the engine ECU 24, for example, include a crank angle θcr from a crank position sensor 140 for detecting a rotation position of the crankshaft 26, a cooling-water temperature Tw from a water temperature sensor 142 for detecting a temperature of cooling water of the engine 22, and the like. Further, the signals also include: a throttle opening degree TH from a throttle valve position sensor 146 that detects a position of the throttle valve 124 provided in an intake pipe; an intake-air amount Qa from an air flow meter 148 attached to the intake pipe; an intake temperature Ta from a temperature sensor 149 attached to the intake pipe; and the like signals. Further, the signals include: an air/fuel ratio AF from an air-fuel-ratio sensor 135a attached to an exhaust pipe; an oxygen signal O2 from an oxygen sensor 135b attached to the exhaust pipe; and the like signals.

Various control signals for controlling the operation of the engine 22 are output from the engine ECU 24 via the output port. The signals output from the engine ECU 24 include, for example: a driving signal to the cylinder injection valve 125; a driving signal to the port injection valve 126; a driving signal to a throttle motor 136 for adjusting a position of the throttle valve 124; a control signal to an ignition coil 138 integrated with an igniter; and the like signals.

The engine ECU 24 calculates a rotation speed Ne of the engine 22 based on a crank position θcr from the crank position sensor 140, and also calculates a volumetric efficiency (a ratio of a volume of the air to be actually taken in one cycle with respect to a cylinder capacity per one cycle of the engine 22) KL based the intake-air amount Qa from the air flow meter 148 and the rotation speed Ne of the engine 22.

As illustrated in FIG. 1, the planetary gear 30 is configured as a single pinion-type planet gear mechanism. A rotator of the motor MG1 is connected to a sun gear of the planetary gear 30. A drive shaft 36 connected to driving wheels 38a, 38b via a differential gear 37 is connected to a ring gear of the planetary gear 30. The crankshaft 26 of the engine 22 is connected to a carrier of the planetary gear 30 via a flywheel damper 28.

The motor MG1 is configured as a synchronous generator-motor, for example, and its rotator is connected to the sun gear of the planetary gear 30, as described above. The motor MG2 is configured as a synchronous generator-motor, for example, and its rotator is connected to the drive shaft 36. The inverters 41, 42 are used to drive the motors MG1, MG2, and are connected to the battery 50 via a power line 54. The motors MG1, MG2 are rotationally driven such that switching of a plurality of switching elements (not shown) of the inverters 41, 42 is controlled by a motor electronic control unit (hereinafter referred to as the motor ECU) 40.

Although not illustrated herein, the motor ECU 40 is configured as a microprocessor mainly constituted by a CPU, and includes a ROM for storing a processing program, a RAM for temporarily storing data, input/output ports, and a communication port, in addition to the CPU. Signals from various sensors necessary to control the drive of the motors MG1, MG2 are input into the motor ECU 40 via the input port. The signals include, for example, rotation positions θm1, θm2 from rotation position detecting sensors 43, 44 that detect rotation positions of the rotators of the motors MG1, MG2. From the motor ECU 40, switching control signals to the plurality of switching elements (not shown) of the inverters 41, 42 are output via the output port. The motor ECU 40 is connected to the HVECU 70 via the communications port. The motor ECU 40 calculates rotation speeds Nm1, Nm2 of the motors MG1, MG2 based on the rotation positions θm1,θm2 of the rotators of the motors MG1, MG2 from the rotation position detecting sensors 43, 44.

The battery 50 is configured as a lithium-ion secondary battery or a nickel hydride secondary battery, for example, and is connected to the inverters 41, 42 via the power line 54. The battery 50 is managed by a battery electronic control unit (referred to as a battery ECU) 52.

Although not illustrated herein, the battery ECU 52 is configured as a microprocessor mainly constituted by a CPU, and includes a ROM for storing a processing program, a RAM for temporarily storing data, input/output ports, and a communication port, in addition to the CPU. Signals from various sensors necessary to manage the battery 50 are input into the battery ECU 52 via the input port. The signals include, for example: a voltage Vb from a voltage sensor 51a attached between terminals of the battery 50; and a current Ib from a current sensor 51b attached to an output terminal of the battery 50; and the like signals. The battery ECU 52 is connected to the HVECU 70 via a communication port. The battery ECU 52 calculates a state of charge SOC based on an integrated value of the battery current Ib from the current sensor 51b. The state of charge SOC indicates a ratio of a capacity of electric power that can be discharged from the battery 50 with respect to a full capacity of the battery 50.

Although not illustrated herein, the HVECU 70 is configured as a microprocessor mainly constituted by a CPU, and includes a ROM for storing a processing program, a RAM for temporarily storing data, input/output ports, and a communication port, in addition to the CPU. Signals from various sensors necessary are input into the HVECU 70 via the input port. The signals input into the HVECU 70 include, for example: an ignition signal from an ignition switch 80; a shift position SP from a shift position sensor 82; and the like signals. Further, the signals include: an accelerator opening degree Acc from an accelerator pedal position sensor 84; a brake pedal position BP from a brake pedal position sensor 86; a vehicle speed V from a vehicle speed sensor 88; and the like signals. As described above, the HVECU 70 is connected to the engine ECU 24, the motor ECU 40, and the battery ECU 52 via the communications ports.

Here, as the shift position SP, a parking position (P position), a reverse position (R position), a neutral position (N position), and a drive position (D position) are prepared. Further, a brake position (B position) and a sequential position (S position) are also prepared. The B position is a position at which a driving force in an accelerator ON state is set similarly to the D position and a braking force in an accelerator OFF state is set larger than that of the D position. The S position is a position at which a driving force in the accelerator ON state and a braking force (a braking force larger than that of the D position) in the accelerator OFF state during traveling are changed at six stages (braking forces corresponding to gear stages S1 to S6). Hereby, at the S position, a speed change feeling by a virtual stepped transmission can be given to a driver.

In the hybrid vehicle 20 of the embodiment configured as such, a requested driving force of the drive shaft 36 is set based on the accelerator opening degree Acc and the vehicle speed V, and the operations of the engine 22 and the motors MG1, MG2 are controlled so that a requested power corresponding to the requested driving force is output to the drive shaft 36. An operation mode of the engine 22 and the motors MG1, MG2 include the following modes (1) to (3). (1) Torque conversion operation mode: a mode in which the operation of the engine 22 is controlled so that a power corresponding to the requested power is output from the engine 22, and the motors MG1, MG2 are drive-controlled so that all the power output from engine 22 is torque-converted by the planetary gear 30 and the motors MG1, MG2 and the requested power is output to the drive shaft 36. (2) Charging/discharging operation mode: a mode in which the operation of the engine 22 is controlled so that a power corresponding to a sum of the requested power and a power necessary for charging/discharging of the battery 50 is output from the engine 22, and the motors MG1, MG2 are drive-controlled so that all or part of the power output from the engine 22 is torque-converted by the planetary gear 30 and the motors MG1, MG2 in accompany with charging/discharging of the battery 50 and the requested power is output to the drive shaft 36. (3) Motor operation mode: a mode in which the operation of the engine 22 is stopped, and the motor MG2 is drive-controlled so that the requested power is output to the drive shaft 36.

Further, in the hybrid vehicle 20 of the embodiment, at the time of operating the engine 22, the engine ECU 24 performs an intake-air amount control to adjust an opening degree (a throttle opening degree TH) of the throttle valve 124, a fuel injection control to adjust fuel injection amounts from the cylinder injection valve 125 and the port injection valve 126, an ignition control to adjust an ignition timing of the ignition plug 130, and the like controls, so that a target torque Te* is output from the engine 22. Here, in terms of the fuel injection control, an execution injection mode is set from the port injection mode, the cylinder injection mode, and the joint injection mode based on the operating state of the engine 22 (e.g., the rotation speed Ne and the volumetric efficiency KL of engine 22), so as to perform the fuel injection control in the execution injection mode thus set.

Here, when the engine 22 performs an autonomous operation (no-load operation), a necessary total fuel injection amount is small. Accordingly, in order to secure a minimum fuel injection amount of an injection valve to perform fuel injection out of the cylinder injection valve 125 and the port injection valve 126, the port injection mode or the cylinder injection mode is set as the execution injection mode. More specifically, the port injection mode and the cylinder injection mode are set alternately as the execution injection mode. The reason is as follows. Generally, in the cylinder injection mode, a combustion state easily becomes unstable as compared with the port injection mode, so a rotation fluctuation of the engine 22 easily increases. On this account, it is basically preferable to set the port injection mode as the execution injection mode. However, when the port injection mode is continued, deposits may be accumulated in the cylinder injection valve 125 due to an increase or the like of a temperature in the combustion chamber, so it is necessary to restrain this. In consideration of this, the port injection mode and the cylinder injection mode are set alternately as the execution injection mode. Further, when the engine 22 performs an autonomous operation, the autonomous operation is performed on the engine 22 at a rotation speed Nid corresponding to the shift position SP (the D position or the B position or the S position), the cooling-water temperature Tw, and the like. It is conceivable that, when the shift position SP is at the S position and a gear stage is on a low-speed gear position side, the rotation speed Nid is increased as compared with a case where the gear stage is on a high-speed gear position side, or when the cooling-water temperature Tw is less than a warming-up completion temperature Twref (e.g., 70° C., 75° C., 80° C., and the like), the rotation speed Nid is increased as compared with a case where the cooling-water temperature Tw is the warming-up completion temperature Twref or more.

Further, in the hybrid vehicle 20 of the embodiment, the engine ECU 24 determines whether or not a misfire occurs in the engine 22, as follows. First, a 30-degree necessary time T30 as a time required to rotate the crank angle θcr of the crankshaft 26 only by 30 degrees from a top dead center is calculated for each ignition cycle. Here, the ignition cycle is a rotation angle of the crankshaft 26 at which ignition is performed in any of the cylinders of the engine 22. In a case where the engine 22 is a four-cylinder engine, the ignition cycle is 90 degrees, and in a case where the engine 22 is a six-cylinder engine, the ignition cycle is 120 degrees. Subsequently, a necessary-time change amount ΔT30 is calculated by subtracting a 30-degree necessary time T30 calculated at a time that is earlier than a latest 30-degree necessary time T30 by one ignition cycle. When the necessary-time change amount ΔT30 is a misfire determination threshold ΔT30*ref* or less, it is determined that a misfire does not occur in the engine 22, and when the necessary-time change amount ΔT30 is larger than the misfire determination threshold ΔT30*ref*, it is determined that a misfire occurs in the engine 22.

Figure 3:
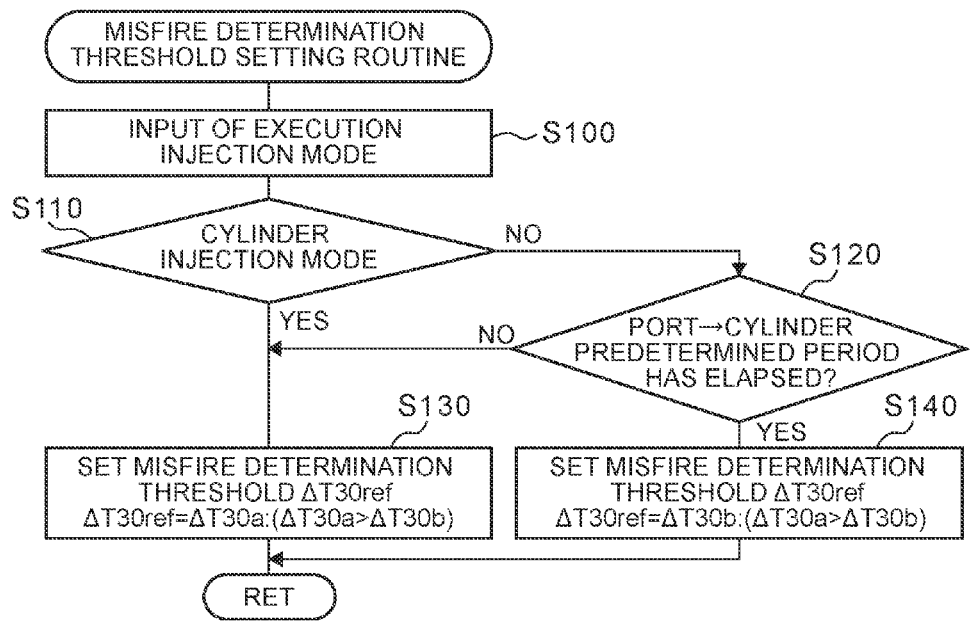
FIG. 3 is a flowchart illustrating one example of a misfire determination threshold setting routine executed by an engine ECU according to the embodiment.

Next will be described the operation of the hybrid vehicle 20 of the embodiment configured as such, particularly, an operation in a case where the misfire determination threshold ΔT30*ref* is set at the time when the engine 22 performs the autonomous operation. FIG. 3 is a flowchart illustrating one example of a misfire determination threshold setting routine executed by the engine ECU 24 according to the embodiment. When the engine 22 performs the autonomous operation, this routine is performed repeatedly. Note that, as described above, when the engine 22 performs the autonomous operation, the fuel injection control is performed by setting the cylinder injection mode or the port injection mode as the execution injection mode. Further, in the present embodiment, when the engine 22 performs the autonomous operation, combustion of the engine 22 easily becomes unstable and a misfire easily occurs as compared with a case of performing a load operation. In consideration of this, in order to more accurately determine whether or not a misfire occurs in the engine 22 at this time, this routine is targeted for the case where the engine 22 performs the autonomous operation.

When the misfire determination threshold setting routine is executed, the engine ECU 24 first inputs the execution injection mode (the port injection mode or the cylinder injection mode) (step S100), and determines whether the execution injection mode thus input is the port injection mode or the cylinder injection mode (step S110). When it is determined that the execution injection mode is the cylinder injection mode, the misfire determination threshold ΔT30*ref* is set to a value ΔT30*a* (first value) (step S130), and the routine is finished. Accordingly, when the port injection mode is changed to the cylinder injection mode, the misfire determination threshold ΔT30*ref* is immediately changed to the value ΔT30*a* from the after-mentioned value ΔT30*b* (second value).

When it is determined that the execution injection mode is the port injection mode in step S110, it is determined whether a predetermined period T1 has elapsed after the cylinder injection mode is changed to the port injection mode (step S120). When the predetermined period T1 has not elapsed after the cylinder injection mode is changed to the port injection mode, the misfire determination threshold ΔT30ref is set to the value ΔT30a (step S130). When the predetermined period T1 has elapsed from the change, the misfire determination threshold ΔT30ref is set to the value ΔT30b, which is smaller than the value ΔT30a (step S140), and the routine is finished. Accordingly, when the cylinder injection mode is changed to the port injection mode, the misfire determination threshold ΔT30ref is changed from the value ΔT30a to the value ΔT30b after the predetermined period T1 has elapsed from the change. Here, as the predetermined period T1, a period T1a during which the engine 22 rotates only by predetermined rotations n1 (e.g., 40 rotations, 50 rotations, 60 rotations, and the like), a period T1b during which the crank angle θcr of the engine 22 rotates only by a predetermined angle θcr1 (e.g., an angles corresponding to the predetermined rotations n1), and the like can be used.

Figure 4:
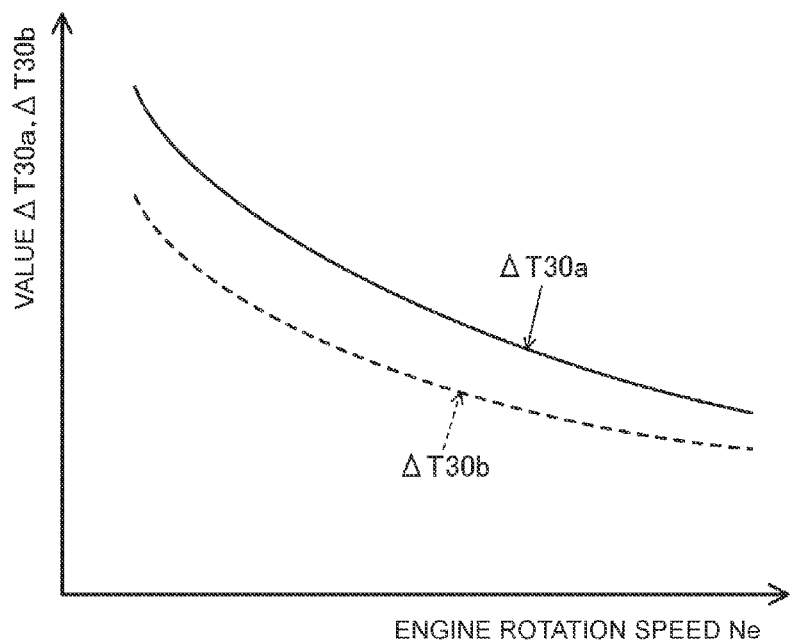
FIG. 4 is an explanatory view illustrating one example of a relationship between a rotation speed of the engine and values $\Delta T30a$, $\Delta T30b$.

The values ΔT30a, ΔT30b are described below. In terms of the values ΔT30a, ΔT30b, in the present embodiment, a relationship between the rotation speed Ne of the engine 22 and the values ΔT30a, ΔT30b is stored in a ROM (not shown) in advance as a map, and when the rotation speed Ne of engine 22 is given, a corresponding value ΔT30a, ΔT30b is derived from the map and set. One example of the relationship between the rotation speed Ne of the engine 22 and the values ΔT30a, ΔT30b is illustrated in FIG. 4. In the figure, a continuous line indicates the value ΔT30a, and a broken line indicates the value Δ30b. As illustrated herein, the values ΔT30a, ΔT30b are set so that the value ΔT30a is larger than the value ΔT30b regardless of the rotation speed Ne of the engine 22. This is because, in the cylinder injection mode, the rotation fluctuation of the engine 22 (the necessary-time change amount ΔT30) easily increases as compared with the port injection mode, as described above. Further, the values ΔT30a, ΔT30b are set so as to be smaller when the rotation speed Ne of the engine 22 is large as compared with a case where the rotation speed Ne is small. More specifically, the values ΔT30a, ΔT30b are set so as to be smaller as the rotation speed Ne of the engine 22 is larger. This is because, when the rotation speed Ne of the engine 22 is large, the 30-degree necessary time T30 for each cylinder is small as compared with a case where the rotation speed Ne is small, so the necessary-time change amount ΔT30 is also easily decreased. Hereby, the values ΔT30a, ΔT30b can be set to more appropriate values corresponding to the rotation speed Ne of the engine 22.

Here, in a case where the cylinder injection mode is changed to the port injection mode, the misfire determination threshold ΔT30ref is changed from the value ΔT30a to the value ΔT30b after the predetermined period T1 has elapsed from the change, and in a case where the port injection mode is changed to the cylinder injection mode, the misfire determination threshold ΔT30ref is immediately changed from the value ΔT30b to the value ΔT30a. Next will be described the reasons of them sequentially.

First described is the reason that, in a case where the cylinder injection mode is changed to the port injection mode, the misfire determination threshold ΔT30ref is changed from the value ΔT30a to the value ΔT30b after the predetermined period T1 has elapsed from the change. As described above, in the cylinder injection mode, the rotation fluctuation of the engine 22 (the necessary-time change amount ΔT30) easily increases as compared with the port injection mode. Because of this, when the cylinder injection mode is changed to the port injection mode, a state where the rotation fluctuation of the engine 22 is relatively large may continue for some period of time. Particularly, in the hybrid vehicle 20, the flywheel damper 28 is connected to the crankshaft 26 of the engine 22, so a state where the rotation fluctuation of the engine 22 is relatively large easily continues due to inertia of the flywheel damper 28. In a case where the misfire determination threshold ΔT30ref is immediately changed from the value ΔT30a to the value ΔT30b at the time when the cylinder injection mode is changed to the port injection mode, the necessary-time change amount ΔT30 becomes larger than the misfire determination threshold ΔT30ref right after the change even though no misfire occurs in the engine 22, which might cause a false determination that a misfire occurs in the engine 22. In consideration of this, in the embodiment, a value used as the above predetermined period T1 (the period T1a and the period T1b) is a value determined to be a necessary period to shift to the rotation fluctuation of the engine 22 when a misfire does not occur in the engine 22 at the time of the autonomous operation of the engine 22 in the port injection mode from the rotation fluctuation of the engine 22 when a misfire does not occur in the engine 22 at the time of the autonomous operation of the engine 22 in the cylinder injection mode, or a value determined to be slightly longer than the necessary period. Further, in the embodiment, the misfire determination threshold ΔT30ref is changed from the value ΔT30a to the value ΔT30b after the predetermined period T1 has elapsed from the change from the cylinder injection mode to the portion injection mode. Accordingly, it is possible to restrain such a situation that the necessary-time change amount ΔT30 becomes larger than the misfire determination threshold ΔT30ref even though no misfire occurs in the engine 22 right after the change, thereby making it possible to restrain a false determination of the misfire in the engine 22.

Subsequently, the following describes the reason to change the misfire determination threshold ΔT30ref from the value ΔT30b to the value ΔT30a immediately when the port injection mode is changed to the cylinder injection mode. Generally, an increase of the rotation fluctuation of the engine 22 due to the change from the port injection mode to the cylinder injection mode appears in a relativity short time. On this account, in a case where, when the port injection mode is changed to the cylinder injection mode, the misfire determination threshold ΔT30ref is changed from the value ΔT30b to the value ΔT30a after some period has elapsed from the change, the necessary-time change amount ΔT30 becomes larger than the misfire determination threshold ΔT30ref even though no misfire occurs in the engine 22, which might cause a false determination that a misfire occurs in the engine 22. In contrast, in the embodiment, when the port injection mode is changed to the cylinder injection mode, the misfire determination threshold ΔT30ref is immediately changed from the value ΔT30b to the value ΔT30a. Accordingly, it is possible to restrain such a situation that the necessary-time change amount ΔT30 becomes larger than the misfire determination threshold ΔT30ref even though no misfire occurs in the engine 22, thereby making it possible to restrain a false determination of the misfire in the engine 22.

In the hybrid vehicle 20 of the embodiment described above, basically, the misfire determination threshold ΔT30ref is set to the value ΔT30a in the cylinder injection mode, and the misfire determination threshold ΔT30ref is set to the value ΔT30b, which is smaller than the value ΔT30a, in the port injection mode, and when the necessary-time change amount ΔT30 is larger than the misfire determination threshold ΔT30ref, it is determined that a misfire occurs in the engine 22. In a case where the cylinder injection mode is changed to the port injection mode, the misfire determination threshold $\Delta T30ref$ is changed from the value $\Delta T30a$ to the value $\Delta T30b$ after the predetermined period T1 has elapsed from the change. Further, in a case where the port injection mode is changed to the cylinder injection mode, the misfire determination threshold $\Delta T30ref$ is immediately changed from the value $\Delta T30b$ to the value $\Delta T30a$. This makes it possible to restrain a false determination of the misfire in the engine 22.

In the hybrid vehicle 20 of the embodiment, the values $\Delta T30a$, $\Delta T30b$ ($\Delta T30a > \Delta T30b$) to which the misfire determination threshold $\Delta T30ref$ is set are based on the rotation speed Ne of the engine 22. However, the values $\Delta T30a$, $\Delta T30b$ may be set to uniform values regardless of the rotation speed Ne of the engine 22.

Figure 5:
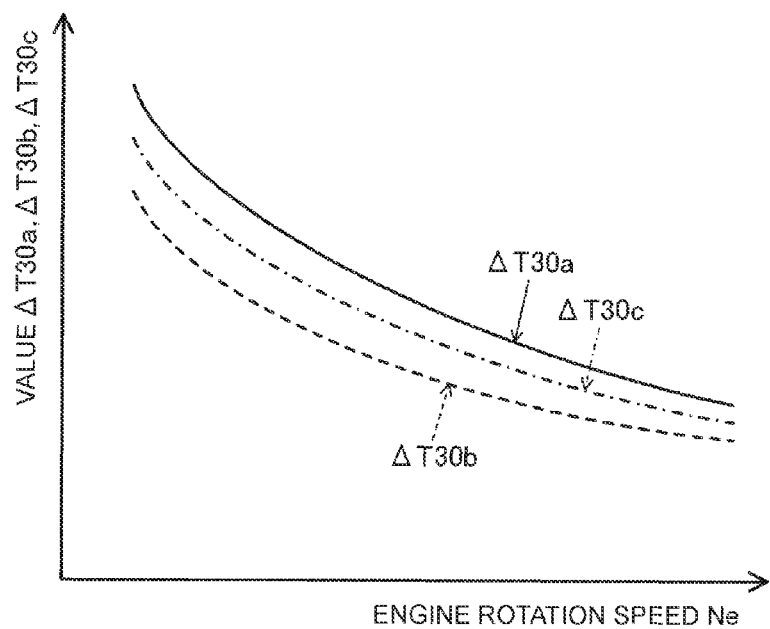
FIG. 5 is an explanatory view illustrating one example of a relationship between a rotation speed of an engine and values $\Delta T30a$, $\Delta T30b$ in a modification.

In terms of the hybrid vehicle 20 of the embodiment, the method of setting the misfire determination threshold $\Delta T30ref$ at the time when the engine 22 performs the autonomous operation has been described above. At the time when the engine 22 performs a load operation, the misfire determination threshold $\Delta T30ref$ may be set as follows. Note that, when the engine 22 performs the autonomous operation, the cylinder injection mode or the port injection mode is set as the execution injection mode. However, when the engine 22 performs the load operation, the port injection mode, the joint injection mode, or the cylinder injection mode is set as the execution injection mode. At the time when the engine 22 performs the load operation, basically, the misfire determination threshold $\Delta T30ref$ is set to the value $\Delta T30a$ in the cylinder injection mode, and the misfire determination threshold $\Delta T30ref$ is set to the value $\Delta T30b$, which is smaller than the value $\Delta T30a$, in the port injection mode. In the joint injection mode, the misfire determination threshold $\Delta T30ref$ is set to a value $\Delta T30c$, which is smaller than the value $\Delta T30a$ and which is larger than the value $\Delta T30b$. This is because, at the time when the engine 22 performs the load operation, combustion is stabilized more easily and the rotation fluctuation is easily made smaller in order of the cylinder injection mode, the joint injection mode, and the port injection mode. In a case where the values $\Delta T30a$, $\Delta T30b$, and $\Delta T30c$ are set to values corresponding to the rotation speed Ne of the engine 22, it is possible to establish a relationship between the rotation speed Ne of the engine 22 and the values $\Delta T30a$, $\Delta T30b$, and $\Delta T30c$, as illustrated in FIG. 5 obtained by adding the value $\Delta T30c$ to FIG. 4. In the figure, a continuous line indicates the value $\Delta T30a$, a broken line indicates the value $\Delta T30b$, and an alternate long and short dash line indicates the value $\Delta T30c$. Note that the values $\Delta T30a$, $\Delta T30b$, and $\Delta T30c$ may be set to uniform values regardless of the rotation speed Ne of the engine 22.

In a case where the cylinder injection mode is changed to the joint injection mode, the misfire determination threshold $\Delta T30ref$ is changed from the value $\Delta T30a$ to the value $\Delta T30c$ after a predetermined period T3 has elapsed from the change. In a case where the cylinder injection mode is changed to the port injection mode, the misfire determination threshold $\Delta T30ref$ is changed from the value $\Delta T30a$ to the value $\Delta T30b$ after a predetermined period T4 has elapsed from the change. Further, when the joint injection mode is changed to the port injection mode, the misfire determination threshold $\Delta T30ref$ is changed from the value $\Delta T30c$ to the value $\Delta T30b$ after a predetermined period T5 has elapsed from the change. Here, the predetermined periods T3, T4, T5 can be set appropriately similarly to the predetermined period T1 described above. Hereby, it is possible to restrain such a situation that the necessary-time change amount $\Delta T30$ becomes larger than the misfire determination threshold $\Delta T30ref$ even though no misfire occurs in the engine 22 right after the change from the cylinder injection mode to the joint injection mode or right after the change from the cylinder injection mode or the joint injection mode to the port injection mode, thereby making it possible to restrain a false determination of the misfire in the engine 22.

Further, when the port injection mode is changed to the joint injection mode, the misfire determination threshold $\Delta T30ref$ is immediately changed from the value $\Delta T30b$ to the value $\Delta T30c$, when the port injection mode is changed to the cylinder injection mode, the misfire determination threshold $\Delta T30ref$ is immediately changed from the value $\Delta T30b$ to the value $\Delta T30a$, and when the joint injection mode is changed to the cylinder injection mode, the misfire determination threshold $\Delta T30ref$ is immediately changed from the value $\Delta T30c$ to the value $\Delta T30a$. Hereby, it is possible to restrain such a situation that the necessary-time change amount $\Delta T30$ becomes larger than the misfire determination threshold $\Delta T30ref$ even though no misfire occurs in the engine 22, thereby making it possible to restrain a false determination of the misfire in the engine 22.

In the hybrid vehicle 20 of the embodiment, the necessary-time change amount $\Delta T30$ based on the 30-degree necessary time T30 is compared with the misfire determination threshold $\Delta T30ref$, so as to determine whether or not a misfire occurs in the engine 22. However, an angular velocity change amount based on a rotation angular velocity corresponding to an inverse of the 30-degree necessary time T30 may be compared with a threshold corresponding to an inverse of the misfire determination threshold $\Delta T30ref$, so as to determine whether or not a misfire occurs in the engine 22.

In the hybrid vehicle 20 of the embodiment, the 30-degree necessary time T30 as a time required to rotate the crank angle θcr of the crankshaft 26 only by 30 degrees is calculated so as to calculate the necessary-time change amount $\Delta T30$ based on the 30-degree necessary time T30. However, instead of 30 degrees, 10 degrees, 20 degrees, and the like may be used.

In the hybrid vehicle 20 of the embodiment, the necessary-time change amount $\Delta T30$ is calculated by subtracting a 30-degree necessary time T30 calculated at a time that is earlier than a latest 30-degree necessary time T30 by one ignition cycle. However, the necessary-time change amount $\Delta T30$ may be calculated by subtracting a 30-degree necessary time T30 calculated at a time that is earlier than a latest 30-degree necessary time T30 by two ignition cycles.

Figure 6:
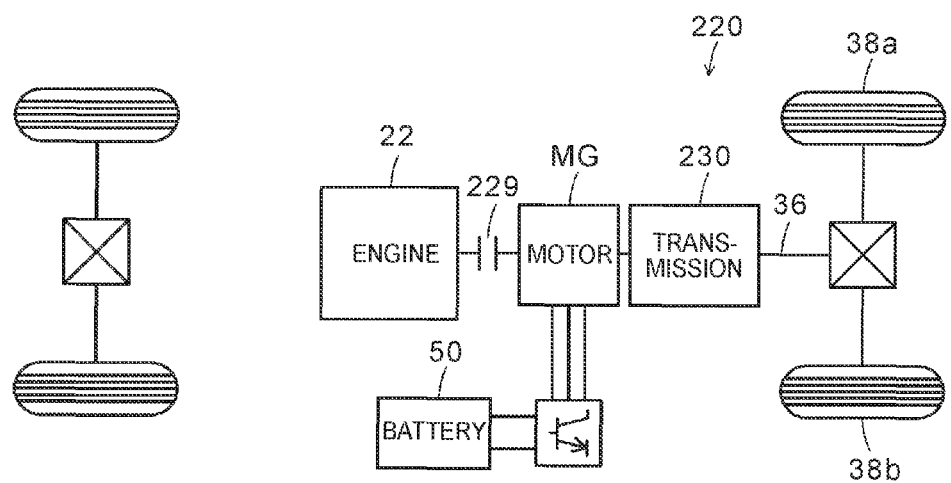
FIG. 6 is a configuration diagram illustrating an outline of a configuration of a hybrid vehicle in a modification.
Figure 7:
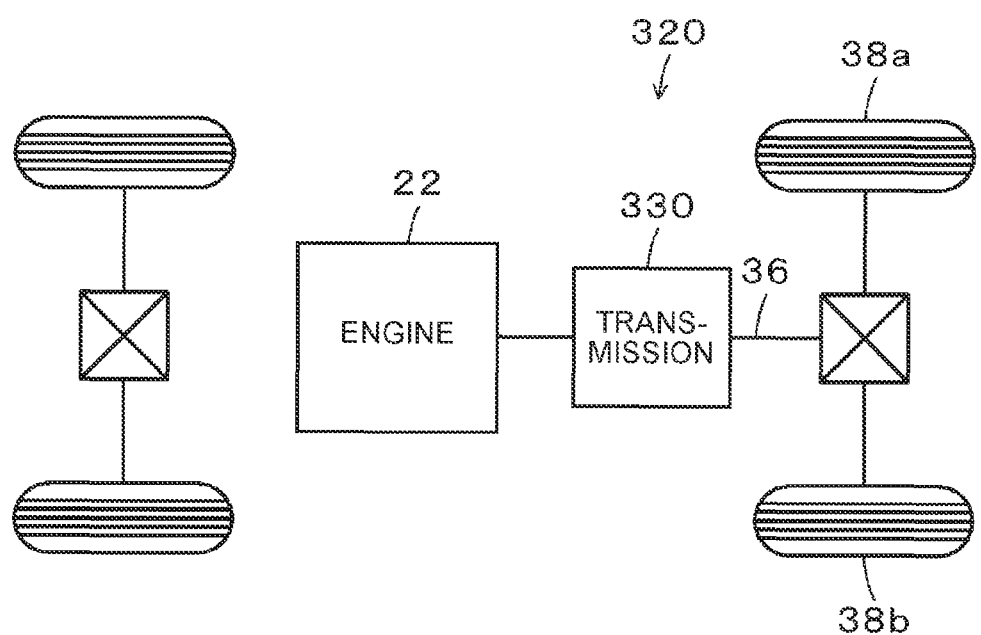
FIG. 7 is a configuration diagram illustrating an outline of a configuration of a vehicle in a modification.

In the hybrid vehicle 20 of the embodiment, the planetary gear 30 is connected to the engine 22, the motor MG1, and the drive shaft 36 connected to the driving wheels 38a, 38b, and the motor MG2 is connected to the drive shaft 36. However, as illustrated in a hybrid vehicle 220 of a modification in FIG. 6, a motor MG may be connected to a drive shaft 36 connected to driving wheels 38a, 38b via a transmission 230, and an engine 22 may be connected to a rotating shaft of the motor MG via a clutch 229. Further, as illustrated in a vehicle 320 of a modification in FIG. 7, a drive motor may not be provided, and an engine 22 may be connected to a drive shaft 36 connected to driving wheels 38a, 38b via a transmission 330.

In the embodiment of the present disclosure, the controls are performed by the HVECU 70, the engine ECU 24, the motor ECU 40, and the battery ECU 52 are one example of an "electronic control unit", but all the controls may be performed by one ECU.

The following describes elements of the embodiment. In the present embodiment, the engine 22 is one example of an "engine," and the engine ECU 24 is one example of an "electronic control unit".

Note that the correspondence between the elements of the embodiment and the elements of the summary are just non-limiting examples to specifically describe the configuration for the embodiment to perform the disclosure described in the summary. That is, the interpretation of the summary should be made based on the summary, and the embodiment is merely one concrete example of the disclosure described in the summary.

The configuration to perform the present disclosure has been explained by use of the embodiment, but it is needless to say that the present disclosure is not limited to such an embodiment at all and may be performable in various embodiments as long as the various embodiments are not beyond the gist thereof.

The present disclosure is usable in a manufacture industry of a vehicle, and the like.

What is claimed is:

1. A vehicle comprising:
    an engine including a cylinder injection valve configured to inject fuel into a cylinder, and a port injection valve configured to inject the fuel into an intake port; and
    an electronic control unit configured to
    i) control the engine by changing between a cylinder injection mode and a port injection mode,
        the cylinder injection mode being a mode in which the fuel is injected into the cylinder only from the cylinder injection valve,
        the port injection mode being a mode in which the fuel is injected into the intake port only from the port injection valve,
    ii) set a misfire determination threshold to a first value in the cylinder injection mode,
    iii) set the misfire determination threshold to a second value smaller than the first value in the port injection mode,
    iv) determine that a misfire occurs in the engine when a rotation fluctuation of the engine is larger than the misfire determination threshold, and
    v) change the misfire determination threshold from the first value to the second value when a predetermined period has elapsed after the cylinder injection mode is changed to the port injection mode.

2. The vehicle according to claim 1, wherein
    the electronic control unit is configured to change the misfire determination threshold from the second value to the first value immediately after the port injection mode is changed to the cylinder injection mode.

3. The vehicle according to claim 1, wherein
    the electronic control unit is configured to
    vi) calculate, as the rotation fluctuation, a change amount of a time required for an output shaft of the engine to rotate only by a predetermined rotation angle, and
    vii) determine the first value such that the first value when a rotation speed of the engine is large is smaller than the first value when the rotation speed of the engine is small, and
    viii) determine the second value such that the second value when the rotation speed of the engine is large is smaller than the second value when the rotation speed of the engine is small.

4. The vehicle according to claim 1, wherein
    the electronic control unit is configured to change the misfire determination threshold from the first value to the second value when a predetermined period has elapsed after the cylinder injection mode is changed to the port injection mode while the engine performs an autonomous operation.

5. The vehicle according to claim 1, wherein
    an output shaft of the engine is connected to an axle connected to driving wheels via a flywheel damper.

6. A control method for a vehicle, the vehicle including
    an engine including a cylinder injection valve configured to inject fuel into a cylinder, and a port injection valve configured to inject the fuel into an intake port, and
    an electronic control unit,
the control method comprising:
    i) controlling, by the electronic control unit, the engine by changing between a cylinder injection mode and a port injection mode,
        the cylinder injection mode being a mode in which the fuel is injected into the cylinder only from the cylinder injection valve,
        the port injection mode being a mode in which the fuel is injected into the intake port only from the port injection valve,
    ii) setting, by the electronic control unit, a misfire determination threshold to a first value in the cylinder injection mode,
    iii) setting, by the electronic control unit, the misfire determination threshold to a second value smaller than the first value in the port injection mode;
    iv) determining, by the electronic control unit, that a misfire occurs in the engine when a rotation fluctuation of the engine is larger than the misfire determination threshold; and
    v) changing, by the electronic control unit, the misfire determination threshold from the first value to the second value when a predetermined period has elapsed after the cylinder injection mode is changed to the port injection mode.

* * * * *